US006828371B2

(12) United States Patent
Lee et al.

(10) Patent No.: US 6,828,371 B2
(45) Date of Patent: Dec. 7, 2004

(54) METHOD FOR PRODUCING A WELL-EXFOLIATED AND DISPERSED POLYMER SILICATE NANOCOMPOSITE BY ULTRASONICATION

(75) Inventors: Ellen Cheng-chi Lee, Ann Arbor, MI (US); Deborah Frances Mielewski, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 220 days.

(21) Appl. No.: 10/158,270

(22) Filed: May 30, 2002

(65) Prior Publication Data

US 2003/0134942 A1 Jul. 17, 2003

Related U.S. Application Data

(60) Provisional application No. 60/347,536, filed on Jan. 11, 2002.

(51) Int. Cl.$^7$ .............................................. C08K 3/34
(52) U.S. Cl. .................... 524/445; 524/430; 524/450; 524/493; 524/423; 524/425
(58) Field of Search ................................ 524/445, 449, 524/450, 430, 425, 423, 492, 493

(56) References Cited

U.S. PATENT DOCUMENTS 5,433,112 A * 7/1995 Piche et al. .................... 73/597
6,207,775 B1   3/2001 Marti et al.
6,361,733 B1 * 3/2002 Eicher et al. ............... 264/443

OTHER PUBLICATIONS

Barber et al. "Formation of Cation Exchanged Nanocomposite" Polymer Preprints, vol. 4, No. 2, Aug. 1999.*
Bernhart E., et al. "Effect of Ultrasound on thermoplastic melts" Journal of Industrial Engineering Chemistry (1954), 46, 742–746.*

A. Usuki et al., "Characterization and Properties of Nylon 6—Clay Hybrid", Toyota Central Res. & Develop. Labs., Inc., Japan.
J. Watkins et al., "Polymer/Metal Nanocomposite Synthesis in Supercritical $CO_2$," Chemistry of Materials, Nov. 1995, pp. 1991–1994, vol. 7, No. 11, Am. Chem. Soc.
L. Gerhardt et al., "Concentration–Dependent Viscoelastic Scaling Models for Polydimethylsiloxane Melts with Dissolved Carbon Dioxide," Journal of Polymer Science: Part B: Polymer Physics, vol. 36, pp. 1911–1918, 1998, John Wiley & Sons, Inc.
J. Smith, "Correction and Extension of van der Poel's Method for Calculating the Shear Modulus of a Particulate Composite," Journal of Research of the Nat'l Bureau of Standards, vol. 78A, No. 3, May–Jun. 1974.
O.P. Harcup et al., "Deformation and Fracture of Polymer Silicate Nanocomposites," Polymeric Materials Science and Engineering, pp. 204–207, Am. Chem. Soc., 1998.
M. Weimer et al., "Direct Synthesis of Dispersed Nanocomposites by in Situ Living Free Radical Polymerization Using Silicate–Anchored Initiator," Am. Chem. Soc., 1999, pp. 1615–1616, vol. 121.

(List continued on next page.)

Primary Examiner—Katarzyna Wyrozebski
(74) Attorney, Agent, or Firm—Brooks Kushman PC; Damian Porcari

(57) ABSTRACT

The present invention discloses a method for dispersing and exfoliating fillers in a thermoplastic polymer by sonicating a mixture of the thermoplastic polymer and the filler. The method of the present invention is particularly useful in dispersing layered silicate clays in thermoplastic polymers. A reinforced composite comprising a filler dispersed in a thermoplastic polymer is also disclosed. In another variation, the method of the invention is incorporated into conventional plastic extruder and injection molding equipment.

41 Claims, 1 Drawing Sheet

OTHER PUBLICATIONS

K. Mitsuishi et al., "Effect of Filler Properties on the Modulus of Oriented Polypropylene Filled with Flake–Like Fibers," J. Macromol. Sci.–Phys., vol. B26, No. 4, pp. 479–494, 1987.

T. Walker et al., "Enhanced Miscibility of Low–Molecular–Weight Polystyrene/Polyisoprene Blends in Supercritical $CO_2$," J. Phys. Chem., vol. B, No. 103, pp. 5472–5476, 1999.

T. Watari et al., "Fabrication of (Expandable Mica) Nylon 6 Composites," Materials Research Bulletin, vol. 32, No. 6, pp. 719–724, 1997.

C. Busigin et al., "Factors Affecting the Mechanical Properties of Mica–Filled Polypropylenes," Polymer Engineering and Science, pp. 766–770, vol. 23, No. 14, Oct. 1983.

"New Materials Reduce Weight, Improve Mechanical and Physical Properties Compared To Conv Systems," General Motors, http://www.gm.com/cgi–bin/pr_display.pl?596, 3 pgs.

A. Usuki et al., "Interaction of Nylon 6–Clay Surface and Mechanical Properties of Nylon 6–Clay Hybrid," Journal of Applied Polymer Science, 1995, pp. 119–123, vol. 55.

J. Tudor et al., "Intercalation of Catalytically Active Metal Complexes In Phylosilicates and Their Application as Propene Polymerisation Catalysts." Chem. Commun., 1996, pp. 2031–2032.

R. Vaia et al., "Interlayer Structure and Molecular Environment of Alkylammonium Layered Silicates," Mater., 1994, vol. 6, pp. 1017–1022.

R. Vaia et al., "Kinetics of Polymer Melt Intercalation," Macromolecules, 1995, vol. 28, pp. 8080–8085.

R. Vaia et al., "Lattice Model of Polymer Melt Intercalation in Organically–Modified Layered Silicates," Macromolecules, 1997, vol. 30, pp. 7990–7999.

Y. Kojima et al., "Mechanical Properties of Nylon 6–Clay Hybrid," Materials Research Society, May 1993, vol. 8, No. 5, pp. 1185–1189.

R. Vaia et al., "Microstructural Evolution of Melt Intercalated Polymer–Organically Modified Layered Silicates Nanocomposites," Am. Chem. Soc., 1996, vol. 8, pp. 2628–2635.

Y. Lyatskaya et al., "Modeling the Phase Behavior of Polymer–Clay Composites," Am. Chem. Soc., 1998, vol. 31, pp. 6676–6680.

E. Hackett et al., "Molecular Dynamics Simulations of Organically Modified Layered Silicates," J. Chem. Phys., vol. 108, No. 17, May 1998, pp. 7410–7415.

H.G. Jeon et al., "Morphology of Polymer/Silicate Nanocomposites," Polymer Bulletin, vol. 41, pp. 107–113, 1998.

Q. Liu et al., "Nano–apatite/Polymer Composites: Mechanical and Physicochemical Characteristics," Biomaterials, vol. 18, No. 19, 1997, pp. 1263–1270.

"Nanocomposites 2002," Jan. 28–29, 2002, The Netherlands.

X. Kornmann et al., "Nanocomposites Based on Montmorillonite and Unsaturated Polyester," Polymer Engineering and Science, Aug. 1998, vol. 38, No. 8, pp. 1351–1358.

Z. Wang et al., "Nanolayer Reinforcement of Elastomeric Polyurethane," Am. Chem. Soc., 1998, vol. 10, pp. 3769–3771.

M. Kawasumi et al., "Nematic Liquid Crystal/Clay Mineral Composites," Materials Science and Engineering, vol. C, No. 6, 1998, pp. 135–143.

J.W. Cho et al., "Nylon 6 Nanocomposites By Melt Compounding," Polymer, vol. 42, 2001, pp. 1083–1094.

B. Vogt et al., "Phase Behavior of Nearly Symmetric Polystyrene–Block–Polyisoprene Copolymers in the Presence of $CO_2$ and Ethane," Am. Chem. Soc., 1999, vol. 32, pp. 7907–7912.

J. Watkins et al., "Phase Separation in Polymer Blends and Diblock Copolymers Induced by Compressible Solvents," Am. Chem. Soc., 1999, vol. 32, pp. 7737–7740.

X. Kornmann, "Polymer–Layered Silicate Nanocomposites," Switzerland.

R. Vaia et al., "Polymer Melt Intercalation in Organically–Modified Layered Silicates: Model Predictions and Experiment," Am. Chem. Soc., 1997, vol. 30, pp. 8000–8009.

D.M. Delozier et al., "Preparation and Characterization of Polyimide/Organoclay Nanocomposites," Polymer, vol. 43, 2002, pp. 813–822.

M. Kawasumi et al., "Preparation and Mechanical Properties of Polypropylene–Clay Hybrids," Am. Chem. Soc., vol. 30, 1997, pp. 6333–6338.

N. Hasegawa et al., "Preparation and Mechanical Properties of Polypropylene–Clay Hybrids Using a Maleic Anhydride–Modified Polypropylene Oligomer," Journal of Applied Polymer Science, vol. 67, 1998, pp. 87–92.

G. Qian et al., "Preparation and Properties of Polyolefin Nanocomposites," Polyolefins, 2001, 7 pgs.

Y. Kurokawa et al., "Preparation of a Nanocomposite of Polypropylene and Smectite," Journal of Materials Science, vol. 15, 1997, pp. 1481–1483.

S. Hambir et al., "PP/Clay Nanocomposites: A Study of Crystallization and Dynamic Mechanical Behavior," Journal of Polymer Science: Part B: Polymer Physics, vol. 39, 2001, pp. 446–450.

J.S. Shelley et al., "Reinforcement and Environmental Degradation of Nylon–6/Clay Nanocomposites," Polymer, vol. 42, 2001, pp. 5849–5858.

R. Vaia et al., "Relaxations of Confined Chains in Polymer Nanocomposites: Glass Transition Properties of Poly(ethylene oxide) Intercalated in Montmorillonited," Journal of Polymer Science: Part B: Polymer Physics, vol. 35, 1997, pp. 59–67.

R. Krishnamoorti et al., "Rheology of End–Tethered Polymer Layered Silicate Nanocomposites," Am. Chem. Soc., vol. 30, 1997, pp. 4097–4102.

C. Kwag et al., "Rheology of Molten Polystyrene with Dissolved Supercritical and Near–Critical Gases," Journal of Polymer Science: Part B: Polymer Physics, vol. 37, 1999, pp. 2771–2781.

L. Gerhardt et al., "Rheology of Polydimethylsiloxane Swollen With Supercritical Carbon Dioxide," Dept. of Chem. Eng. and Material Science, 1997.

M. Solomon et al., "Rheology of Polypropylene/Clay Hybrid Materials," Am. Chem. Soc., 9 pgs.

J. Smith, "Simplification of van der Poel's Formula For The Shear Modulus of a Particulate Composite," Journal of Research of the National Bureau of Standards, vol. 79A, No. 2, Mar.–Apr., 1975, pp. 419–423.

K. Webb et al., "Solubility and Diffusion of Carbon Dioxide in Polymers," Elsevier Science, 1999.

F. Rindfleisch et al., "Solubility of Polymers and Copolymers in Supercritical $CO_2$," J. Phys. Chem., vol. 100, 1996, pp. 15581–15587.

R. Krishnamoorti et al., "Structure and Dynamics of Polymer–Layered Silicate Nanocomposites," Am. Chem. Soc., vol. 8, 1996, pp. 1728–1734.

Y. Kurokawa et al., "Structure and Properties of a Montmorillonite/Polypropylene Nanocomposite," Journal of Materials Science Letters, vol. 16, 1997, pp. 1670–1672.

K. Takahama et al., "Supercritical Drying of $SiO_2$–$TiO_2$ Sol–Pillared Clays," Journal of Materials Science, vol. 27, 1992, pp. 1297–1301.

A. Usuki et al., "Swelling Behavior of Montmorillonite Cation Exchanged for w–amino Acids By e–Caprolactam," J. Mater. Res., vol. 8, No. 5, May 1993, pp. 1174–1178.

P. Messersmith, "Synthesis and Characterization of Layered Silicate–Epoxy Nanocomposites," Am. Chem. Soc., vol. 6, 1984, pp. 1719–1725.

J. Bergman et al., Synthesis and Characterization of Polyolefin–Silicate Nanocomposites: A Catalyst Intercalation and In Situ Polymerization Approach Chem. Commun., 1999, pp. 2179–2180.

J. Lee et al., "Synthesis and Characterization of Unsaturated Polyester and Phenolic Resin Nanocomposites," Materials Science and Engineering, Cornell University.

R. Vaia et al., "Synthesis and Properties of Two–Dimensional Nanostructure by Direct Intercalation of Polymer Melts in Layered Silicates," Am. Chem. Soc., vol. 5, 1993, pp. 1694–1696.

A. Usuki et al., "Synthesis of Nylon 6–Clay Hybrid," Mater. Res. Soc., vol. 8, No. 5, May 1993, pp. 1179–1184.

A. Usuki et al., "Synthesis of Polypropylene–Clay Hybrid," Journal of Applied Polymer Science, vol. 63, 1997, pp. 137–139.

M. Kato et al., "Synthesis of Polypropylene Oligomer–Clay Intercalation Compounds," Journal of Applied Polymer Science, vol. 66, 1997, pp. 1781–1785.

Y. Hu et al., "Synthesis of Polyurethane/Clay Intercalated Nanocomposites," Colloid Polym. Sci., vol. 279, 2001, pp. 819–822.

M. Sclavons et al., "The Anhydride Content of Some Commercial PP–g–MA: FTIR and Titration," Journal of Applied Polymer Science, vol. 62, 1996, pp. 1205–1210.

C. Busigin et al., "The Properties of Mica–Filled Polypropylenes," Polymer Engineering and Science, vol. 24, No. 3, Feb. 1984, pp. 169–174.

A. Garg et al., "Thermodynamics of Polymer Melts Swollen With Supercritical Gases," Am. Chem. Soc., vol. 27, 1994, pp. 5643–5653.

J. Ryu et al., "Ultrasonic Degradation of Polypropylene and its Application for The Development of PP Based Copolymer and Nanocomposite," Korea–Australia Rheology Journal, vol. 13, No. 2, Jun. 2001, pp. 61–65.

D.A. Winesett et al., "X–Ray Nicroscopy of Polymer Blends Compatibilized With Clay Nanocomposites," Microsc. Microanal. vol. 6, Suppl. 2, 2000, pp. 1120–1121.

L. Sherman, "Nanocomposites—A Little Goes A Long Way," Plastics Techology Online, Jun. 1999, pp. 52–57.

"GM Announces Use of New Plastic," ASM International— News and Resources.

* cited by examiner

METHOD FOR PRODUCING A WELL-EXFOLIATED AND DISPERSED POLYMER SILICATE NANOCOMPOSITE BY ULTRASONICATION

CROSS-REFERENCE TO RELATED APPLICATION

This application claims the benefit of U.S. provisional patent application Ser. No. 60/347,536, filed Jan. 11, 2002.

BACKGROUND OF THE INVENTION

1. Field of the Invention

This invention relates to methods of forming plastic composites comprising a filler and a thermoplastic polymer. More specifically, the present invention relates to methods of dispersing and exfoliating fillers in thermoplastic polymers.

2. Background Art

Nanocomposites are a class of materials that can address many of the challenges currently presented by automotive plastics and composites needs. These materials offer a variety of desirable properties including: low coefficient of thermal expansion, high heat deflection temperatures, lightweight, improved scratch resistance, and potential application in automotive Class A surfaces. Nanocomposites are polymers reinforced with nanometer sized particles, i.e., particles with a dimension on the order of 1 to several hundred nanometers. These materials can be used in structural, semi-structural, high heat underhood, and Class A automotive components, among others. Polyolefin based nanocomposites, in particular, have long been sought after due to polyolefin's wide usage and low resin cost. The major difficulty lies in generating a well-dispersed, well-exfoliated sample due to differences in polarity and compatibility between the clay and polymer phases.

Reinforced plastic materials are continually finding new uses in automotive components. These materials have certain advantages over metals which include higher impact loads before deformation, lighter weight, increased design flexibility, and corrosion resistance. Automotive structural applications have traditionally been made from continuous glass mat composites and highly filled plastic materials such as sheet molding compound ("SMC") where the polymeric component can be as little as 15% by weight. Both SMC and glass mat composite materials ("GMT"), however, are still relatively high in density.

Automobile trim and semi-structural components, on the other hand, are commonly fabricated from injection moldable thermoplastics and thermosets. These lighter weight composites, such as short fiber and mineral filled thermoplastics, could be substituted for metals or SMC and GMT composites in the same applications if their mechanical properties could meet the more stringent requirements. Virtually all bumper fascias and air intake manifolds have transitioned from metallic materials to plastics. As new plastic-based materials are developed, the transition will also encompass both more structural components, as well as Class A body panels and high heat underhood applications.

Injection moldable thermoplastics have long been mechanically reinforced by the addition of particulate and fiber fillers in order to improve mechanical properties such as stiffness, dimensional stability, and temperature resistance. Typical fillers include chopped glass fiber and talc, which are added at filler loadings of 20–40% in order to obtain significant mechanical reinforcement. At these loading levels, however, low temperature impact performance and material toughness are sacrificed. Polymer-silicate nanocomposite materials can address these issues.

Polymer-layered silicate nanocomposites incorporate a clay filler in a polymer matrix. Two groups of clay are currently recognized—the kaolin group and the montmorillonite group. The molecules of the kaolin are arranged in two sheets or plates, one of silica and one of alumina. Similarly, montmorillonite clays are arranged in two silica sheets and one alumina sheet. The molecules of the montmorillonite clays are less firmly linked together than those of the kaolin group and are thus further apart. Composites incorporating either of these clays are potential candidates for structural, semi-structural, and Class A vertical and horizontal body applications. Nanocomposites have enjoyed increased interest since the initial development of nylon based material by Usuki et al in 1993. (Usuki, A., et al., *Journal of Materials Research*, 1993.8 (5): p. 1179–1184.) Typically, polymer nanocomposites combine an organic polymer with an inorganic layered silicate (in the work of Usuki et al., the thermoplastic material Nylon 6 and a montmorillonite clay). Layered silicates are made up of several hundred thin platelet layers stacked into an orderly packet known as a tactoid. Each of these platelets is characterized by large aspect ratio (diameter/thickness on the order of 100–1000). Accordingly, when the clay is dispersed homogeneously and exfoliated as individual platelets throughout the polymer matrix, dramatic increases in strength, flexural and Young's modulus, and heat distortion temperature are observed at very low filler loadings (<10% by weight) due to the large surface area contact between polymer and filler. The Nylon 6 nanocomposites generated by Usuki were produced by intercalation of caprolactam monomers into the silicate galleries and then in situ polymerization of the monomers. While melt compounding of Nylons with organically modified clays (nanoclays) has also been attempted, the mechanical properties and degree of clay dispersion and exfoliation are slightly short of those of the in situ polymerized type. Efforts to generate similar nanocomposites using other types of thermoplastics and thermosets have enjoyed varying degrees of success.

Due to the polar nature of layered silicates, attempts to generate nanocomposites in a non-polar polyolefin matrix have been only marginally successful. Many research groups have attempted melt compounding of polypropylene and polyethylene based nanocomposites by adding maleic anhydride grafted polypropylene oligomers (PP-MA) to aid in compatibilization and dispersion. While this strategy is somewhat effective in improving nanoclay exfoliation, it requires almost 25% PP-MA, which has the deleterious effect of softening the matrix. To circumvent this issue, a few groups have attempted intercalation of olefin monomers and in situ polymerization to generate polyolefin-silicate nanocomposites. In 1996, Tudor attempted in situ polypropylene polymerization with a Ziegler-Natta catalyst, which produced oligomers, but did not succeed in producing an intercalated or exfoliated structure due to catalyst instability. (Tudor et al., J., et al., *Chemical Communications*, 1996. v. 17, p. 2031–32.) In 1999, Bergman was able to generate an exfoliated polyethylene by in situ polymerization with a new class of catalyst. (Bergman, J. S., et al., *Chemical Communications*, 1999.21: p. 2179–2180.) Polypropylene nanocomposites, however, have yet to be generated by in situ polymerization.

For the reasons set forth above, there exists a need for an improved process for dispersing and exfoliating filler material in a polymer matrix.

SUMMARY OF THE INVENTION

The present invention overcomes the problems encountered in the prior art by providing a method of dispersing and exfoliating a filler in a polymer matrix by sonicating a mixture of the filler and polymer. The method of the present invention comprises:

a) sonicating a polymer mixture comprising a thermoplastic polymer and a filler at a sonic energy level sufficient to disperse the filler within the thermoplastic polymer;

wherein the thermoplastic polymer is in a melted state during the sonication. This method is particularly useful for dispersing and exfoliating a layered silicate in a polymer matrix.

In another embodiment of the present invention, a polymer-filler composite is provided. The polymer-filler composite of the present invention is characterized as having a filler dispersed within a thermoplastic polymer by the method set forth above. The polymer-filler composite of the present invention is preferably used to form a molded part by method such as injection molding, compression molding, blow molding, and the like.

In yet another embodiment of the present invention a sonic mixing apparatus is provided. The sonic mixing apparatus is preferably combined with a number of plastic mixing or molding equipment. Examples of such equipment include, but are not limited to extruders, injection molding equipment, compression molding equipment, blow molding equipment, and the like.

DESCRIPTION OF THE PREFERRED EMBODIMENT(S)

Figure 1:
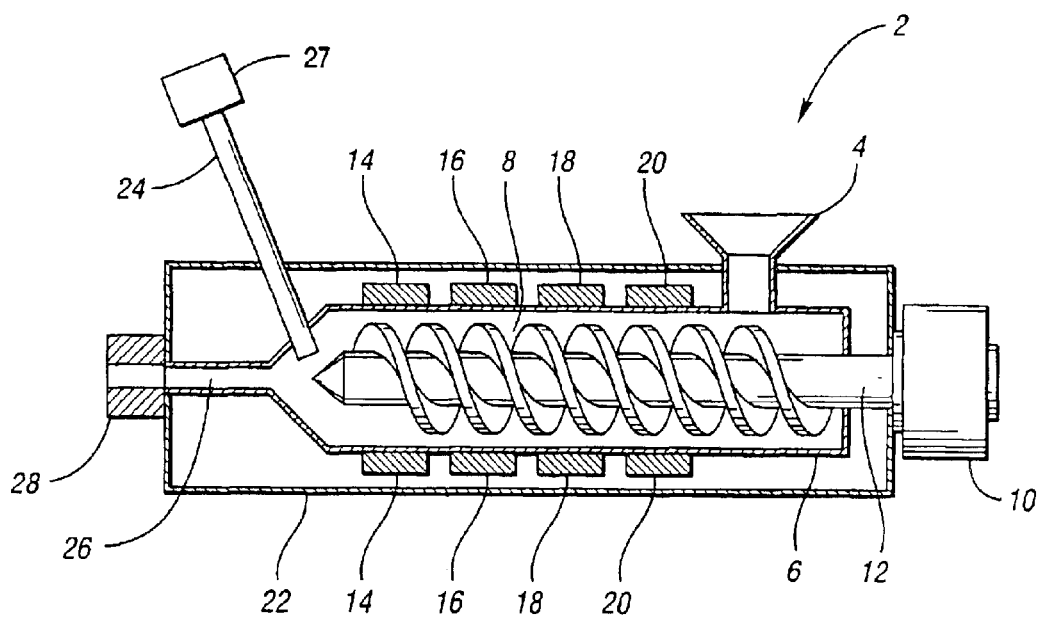
FIG. 1 is a cross-section of a plastic extruder incorporating the sonic mixing apparatus of the present invention.

Reference will now be made in detail to presently preferred compositions or embodiments and methods of the invention, which constitute the best modes of practicing the invention presently known to the inventors.

In an embodiment of the present invention a method for dispersing a filler in a thermoplastic polymer is provided. The method of the present invention comprises:

a) sonicating a polymer mixture comprising a thermoplastic polymer and a filler at a sonic energy level sufficient to disperse the filler within the thermoplastic polymer;

wherein the thermoplastic polymer is in a melted state during the sonication. Sonication may be performed with any device capable of delivering sonic energy in the frequency ranges and energy described below. Such devices will at times be referred to as sonicators, ultrasonicators, sonic probes or ultrasonic probes. For example, a suitable 60 Watt ultrasonic processor with a ½" diameter horn, operating at 20 kHz. is commercially available from Sonics and Materials, Inc. Typically, the sound frequency utilized in the present invention will be in the ultrasonic frequency range. However, frequencies near the upper limit of the audible range are also useful in the present invention. Preferably, the step of sonicating is performed at a sound frequency of 5 kHz to $10^{10}$ kHz. More preferably, the sonicating is performed at a sound frequency range 15 kHz to 200 MHZ, and most preferably, the sonication is performed at a frequency 15 kHz to 40 kHz.

The sonication step of the present invention is further characterized by the sonic energy applied to the polymer mixture. This energy is best described by an energy density defined as the amount of energy per gram of polymer mixture. Preferably, the energy density is from about 5 kJ/g to about 100 kJ/g. More preferably, the energy density is from about 10 kJ/g to about 40 kJ/g, and most preferably the energy density is about 20 kJ/g. The amount of time that a given amount of polymer mixture is sonicated will depend on the amount of energy deployed. For energy densities in the range of about 5 kJ/g to about 100 kJ/g the polymer mixture is preferably sonicated from about 10 seconds to about 10 minutes. For large polymer mixture samples the sonication may be accomplished by using additional sonicators or ultrasonicators. As used herein, the term "sonicator" refers to any source of sonic energy and "ultrasonicator" refers to any source of ultrasonic energy.

A number of fillers can be dispersed in a polymer by the method of the present invention. Preferably, such fillers are present in an amount of about 0.1% to about 30% of the total weight of the polymer mixture. Suitable examples of fillers include, but are not limited to, montmorillonite clay, kaolin clay, calcium carbonate, titanium dioxide, talc, zirconium dioxide, zinc oxide, calcium silicate, aluminum silicate, calcium sulfate, alumina trihydrate, glass fibers, carbon fibers, and mixtures thereof. The preferred fillers will be materials having particles with a size of about 5 nm. to about 1000 nm. with aspect ratios from about 100 to about 1000. More preferably, the filler used in the method of the present invention is a layered silicate clay, and most preferably the filler is an aluminum silicate clay. Suitable fillers include montmorillonite clays such as Cloisite 20A commercially available from Southern Clay Products, Inc, and I.30E commercially available from Nanocor, Inc. These alkyl ammonium cation exchanged montmorillonite clays are referred to as nanoclays. The Southern Clay Products nanoclay is cation exchanged with excess amine, while the Nanocor nanoclays are rinsed of excess salts and purified. In a variation of the present invention, the filler is a mixture of a nanoclay and one or more traditional fillers. Such traditional fillers include, but are not limited to calcium carbonate, titanium dioxide, talc, zirconium dioxide, zinc oxide, calcium silicate, aluminum silicate, calcium sulfate, alumina trihydrate, glass fibers, carbon fibers, and mixtures thereof.

The thermoplastic polymer used in the method of the present invention is preferably a polyolefin-based polymer, a polystyrene-based polymer, a polycabonate polymer, a polyamide polymer, or mixture thereof. More preferably, the thermoplastic polymer used in the method of the present invention is a polyethylene homopolymer, a polyethylene copolymer, a polypropylene homopolymer, or a polypropylene copolymer. Most preferably the thermoplastic polymer is a polypropylene homopolymer.

In accordance with the method of the present invention, the polymer mixture which is sonicated is a combination of a thermoplastic polymer and a filler and may be formed by methods well known to one skilled in the art of polymer science and plastic molding. For example, the polymer mixture may be formed by physically combining a thermoplastic polymer and a filler together to form a polymer premix followed by heating the polymer premix at a sufficient temperature to melt the thermoplastic polymer. Optionally, the heated, melted premix may be mechanically stirred during sonicating. Furthermore, a portion of the polymer is optionally replaced by a compatibilizer such as maleic anhydride grafted polypropylene.

Patent application Ser. No. 09/748,669, filed Dec. 22, 2000, and patent application Ser. No. 09/748,670, filed Dec. 22, 2000, disclose methods of dispersing and exfoliating layered silicates. Both these applications are hereby incorporated by reference. The methods of these applications may be used to form a polymer mixture in which the filler is dispersed or exfoliated to some degree prior to further dispersion and exfoliation by the method of the present invention. Accordingly, the polymer mixture utilized in the method of the present invention may be formed by the process comprising:

a) mixing the layered silicate with the thermoplastic polymer to form a treatable silicate-polymer mixture;

b) contacting the treatable mixture with a supercritical fluid to form a contacted mixture; and c) depressurizing the contacted mixture to form the dispersed/exfoliated polymer composite.

A preferred supercritical fluid is carbon dioxide.

The method of the present invention is advantageously combined with any plastic mixing or molding process in which a thermoplastic polymer and a filler are combined together. Such processes include, but are not limited to, extrusion, injection molding, compression molding, and blow molding. Similarly, the method of the present invention may be utilized during batch processing in a batch mixer such as a banbury mixer. For example, a thermoplastic polymer and a filler are introduced into a plastics extruder and the step of sonicating the mixture is performed while the mixture is within the extruder. Similarly, a mixture of a thermoplastic polymer and a filler is introduced into an injection molding apparatus and the step of sonicating the mixture is performed while the mixture is within the barrel of the injection molding machine.

In another embodiment of the present invention, a polymer-filler composite is provided. The polymer-filler composite of the present invention is characterized as having a filler dispersed within a thermoplastic polymer by the method set forth above. The polymer-filler composite of the present invention is preferably used to form a molded part by method such as injection molding, compression molding, blow molding, and the like.

In yet another embodiment of the present invention a sonic mixing apparatus is provided. The sonic mixing apparatus is preferably combined with a number of plastic mixing or molding equipment. Examples of such equipment include, but are not limited to extruders, injection molding equipment, compression molding equipment, blow molding equipment, and the like. The sonic mixing apparatus of the present invention comprises:

a chamber for holding plastic material;

a stirrer;

a heater in communication with the chamber for heating the chamber and plastic material within the chamber; and at least one sonicator in communication with the chamber and the plastic material for transferring sonic energy to plastic material within the chamber.

In a variation of the present invention the sonic mixing equipment further comprises:

a motor;

a feeder in communication with the chamber for introducing the plastic material into the chamber; and an exit port on the chamber for providing an exit path for the plastic material from the chamber;

wherein the stirrer is at least one screw feeder within the chamber for mixing and moving material through the chamber and the motor is in communication with the screw feeder for turning the screw feeder. The sonic mixing apparatus of this variation optionally further comprises a nozzle in communication with the exit port. The nozzle provides a conduit out of the chamber for the plastic material. In a variation of the sonic mixing apparatus the nozzle is adapted such that the apparatus functions as an extruder. In such an application, the plastic will emerge from the nozzle and be processed by methods known to one skilled in the art of plastic molding. These post-extrusion processes include cooling the plastic and cutting the plastic into pellets. In another refinement of the sonic mixing apparatus, the nozzle is adapted to attach to a mold used for injection molding.

The incorporation of the sonic mixing apparatus with a plastic extruder is best appreciated by reference to FIG. 1. Plastic mixer 2 comprises feeder 4 which is attached to barrel 6. Feeder 4 will is typically a hopper which is capable of introducing one or more materials into barrel 6. Screw feeder 8 is positioned within barrel 6. Screwfeeder 8 turned in a circular motion by motor 10 which is attached to screwfeeder 8 by shaft 12. Heater elements 14, 16, 18, 20 surround barrel 6. Housing 22 surrounds the barrel as indicated in FIG. 1. Sonic horn 24 is positioned with barrel 6. Exit port 26 is located an end of barrel 6 and provides a conduit for plastic to exit barrel 6. During operation, materials which include at least one polymer are introduced into barrel 6 through feeder 4. The at least one polymer is melted by heaters 16, 18, 20, 22 and pushed towards exit port 26 by the rotating motion of screwfeeder 8. The rotating motion of screwfeeder 8 acts to mix the materials. Sonic horn 24 provides sonic energy produced by sonic processor 27 to the materials and thereby assists in dispersing and exfoliating the filler within the polymer. The mixed plastic then emerges from barrel 6 through exit port 26 and then nozzle 28. When the plastic exits nozzle 28, it has typically cooled and started to resolidify. At this point the plastic may be cooled further with a water bath and then chopped into pellets.

Figure 2:
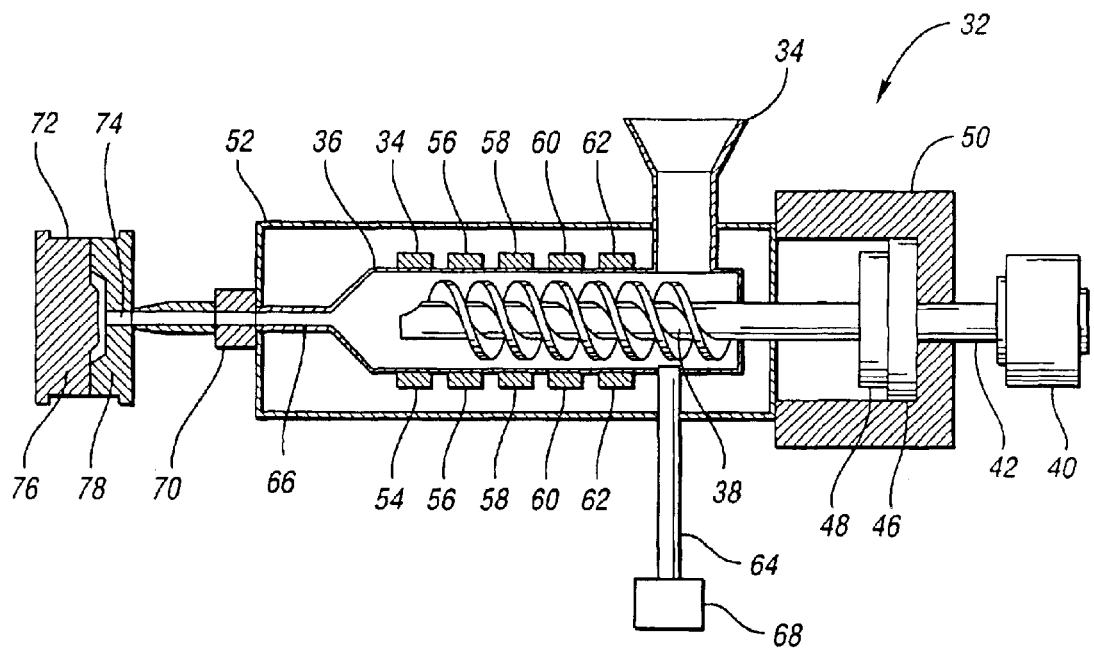
FIG. 2 is a cross-section of an injection molding apparatus utilizing the sonic mixing apparatus of the present invention.

Similarly, the incorporation of the sonic mixing apparatus with an injection molding apparatus is best appreciated by reference to FIG. 2. Sonicating injection molding apparatus 32 comprises feeder 34 which is attached to barrel 36. Feeder 34 will is typically a hopper which is capable of introducing one or more materials into barrel 36. Screw feeder 38 is positioned within barrel 36. Screwfeeder 38 turned in a circular motion by motor 40 which is attached to screwfeeder 38 by shaft 42. Shaft 42 is surrounded by bearings 46, 48. Bearings 46, 48 are enclosed with chamber 50 which is attached to housing 52. Housing 52 surrounds barrel 36 as indicated in FIG. 2. Heater elements 54, 56, 58, 60, 62 surround barrel 36. Sonic horn 64 is positioned with barrel 36. Exit port 66 is located an end of barrel 36 and provides a conduit for plastic to exit barrel 36. During operation materials which include at least one polymer are introduced into barrel 36 through feeder 34. The at least one polymer is melted by heaters 54, 56, 58, 60, 62 and pushed towards exit port 66 by the rotating motion of screwfeeder 38. The rotating motion of screwfeeder 38 acts to mix the materials. Sonic horn 64 delivers sonic energy produced by sonic processor 68 to the materials and thereby assist in dispersing and exfoliating the filler within the polymer. The mixed plastic then emerges from exit port 66 and then nozzle 70. The melted plastic is then introduced into mold 72 through conduit 74. Mold 72 is formed from mold halves 76, 78. In this configuration, screwfeeder 38 is typically moveable along the direction defined by the longitudinal axis of shaft 42. This motion will allow melted plastic to be pushed (injected) into mold 70.

Preparation of the Filler-Polymer Composites

The filler-polymer composites of the present invention are prepared by sonicating a mixture of a filler and a thermoplastic polymer. Suitable examples of fillers include, but are not limited to, montmorillonite clay, kaolin clay, calcium carbonate, titanium dioxide, talc, zirconium dioxide, zinc oxide, calcium silicate, aluminum silicate, calcium sulfate, alumina trihydrate, glass fibers, carbon fibers, and mixtures thereof. Preferably, the filler will be a nanoclay such as Cloisite 20A (Southern Clay Products). Suitable examples of thermoplastic polymers include, but are not limited to, polyolefin-based polymers, polystyrene-based polymers, polycabonate polymers, polyamide polymers, or mixtures thereof. A preferred thermoplastic is polypropylene (Ph020, commercially available from Basell Polyolefins). The nanoclay and thermoplastic polymer are preferably brought together at a nanoclay to polymer ratio of between 1:100 and 2:3. A portion of the polymer is optionally replaced by a compatibilizer such as maleic anhydride grafted polypropylene. The mixture is heated to between 150–210° C. and sonicated. Sonication may be achieved by any source of sonic energy. A preferred method of applying such sonic energy is by placing an ultrasonic horn in contact with the material. For example, an ultrasonic processor (Sonics & Materials, Inc., Model VC60) vibrating at a frequency of 20 kHz to 50 kHz at 100% amplitude with a ½" horn is found to deliver sufficient energy for the examples provided below. The sonic energy delivered should be enough to achieve the desired improved mechanical properties or until a uniform dispersion of the nanoclay is achieved. It will be readily recognized by one skilled in the art of plastic molding and processing that the method of the present invention can be applied to any plastic forming or compounding process in which a plastic and filler can be combined together.

The following examples illustrate the various embodiments of the present invention. Those skilled in the art will recognize many variations that are within the spirit of the present invention and scope of the claims.

EXAMPLE 1

Approximately 1 g of conventionally compounded polymer nanocomposite pellets with composition 5% I.30E (Nanocor, Inc.)+95% Ph020 polypropylene ("FPP") are placed in a vessel and heated to 160° C. A ½" ultrasonic horn is applied to the material and sonicated in a similar manner as in the previous example. Sonication at 20 kHz is performed for several minutes until the energy delivered to the sample reaches 40 kJ.

EXAMPLE 2

Approximately 1g of conventionally compounded polymer nanocomposite pellets with composition 5% I.30E+95% 6523 polypropylene (Basell Polyolefins) are placed in a vessel and heated to 160° C. A ½" ultrasonic horn is applied to the material and sonicated in a similar manner as in the previous example. Sonication at 20 kHz is performed for several minutes until the energy delivered to the sample reaches 40 kJ.

EXAMPLE 3

Approximately 1g of conventionally compounded polymer nanocomposite pellets with composition 5% I.30E+95% 6823 polypropylene (Basell Polyolefins) are placed in a vessel and heated to 160° C. A ½" ultrasonic horn is applied to the material and sonicated in a similar manner as in the previous example. Sonication at 20 kHz is performed for several minutes until the energy delivered to the sample reaches 40 kJ.

EXAMPLE 4

Approximately 1 g of conventionally compounded polymer nanocomposite pellets (Nanocor, Inc.) are placed in a vessel and heated to 160° C. The nanocomposite pellets have a composition of 5% I.30E nanoclay+5% Polybond 3200 (Uniroyal Chemical )+90% 6523 PP. A ½" , ultrasonic horn is applied to the material and sonicated in a similar manner as in the previous example. Sonication at 20 kHz is performed for several minutes until the energy delivered to the sample reaches 40 kJ.

EXAMPLE 5

Approximately 1 g of conventionally compounded polymer nanocomposite pellets with composition 5% supercritical fluid treated nanoclay+95% 6523 polypropylene are placed in a vessel and heated to 160° C. A ½" ultrasonic horn is applied to the material and sonicated in a similar manner as in the previous example. Sonication at 20 kHz is performed for several minutes until the energy delivered to the sample reaches 40 kJ.

EXAMPLE 6

Approximately 4.5 g of polypropylene is dry mixed with 0.25 g of maleic anhydride grafted polypropylene and 0.25 g of nanoclay in a vessel. The vessel is heated to 165° C. An ultrasonic horn is brought into contact with the mixture. The melt is sonicated at 20 kHz for 5 minutes.

EXAMPLE 7

Approximately 4.75 g of nylon 6 is dry mixed with 0.25 g of nanoclay in a vessel. The vessel is heated to 240° C. An ultrasonic horn is brought into contact with the mixture. The melt is sonicated at 30 kHz for 1 minute.

EXAMPLE 8

Approximately 4.7 g of polypropylene is dry mixed with 0.3 g of nanoclay in a vessel. The vessel is heated to 150° C. An ultrasonic horn is brought into contact with the mixture to impart sonic energy. The combination of heat and sonic energy is sufficient to cause the mixture to melt. The melt is sonicated for several minutes at 40 kHz until the energy delivered to the sample reaches 20 kJ.

EXAMPLE 9

Approximately 5 g of polymer nanocomposite masterbatch (nanoclay concentrate, Nanocor, Inc. C. 30P) pellets are placed in a vessel and heated to 175° C. The masterbatch has a composition of 40% I.30E nanoclay+30% Polybond 3200+30% 6523 PP. An ultrasonic horn is applied to the material and sonicated at 20 kHz for 5 minutes. The sonicated masterbatch is let down with 28.3 g polypropylene and compounded.

EXAMPLE 10

Approximately 80 g of conventionally compounded polymer nanocomposite pellets are placed in a batch mixer (Haake Model 600). The mixer is heated to 170° C. and sheared at 60 rpm. An ultrasonic horn is placed in the melt and sonic energy at 20 kHz is imparted into the sample for 5 minutes.

EXAMPLE 11

Approximately 80 g of polymer nanocomposite masterbatch pellets are placed in a heated banbury mixer and mixed at 75 rpm. An ultrasonic horn is placed into the melt and ultrasonicated at 20 kHz for 30 minutes. The ultrasonicated masterbatch is let down with 533.3 g polypropylene and compounded.

EXAMPLE 12

Polypropylene and nanoclay are fed into a twin screw extruder (ThermoHaake Rheomex Model PTW25) at a ratio of 19:1. The extruder is heated to 185° C. As the material is compounded, the melt contacts an ultrasonic horn vibrating at 20 kHz. The compounded strand is cooled through a water bath and pelletized.

EXAMPLE 13

Polyproplyene, maleic anhydride grafted polypropylene, and nanoclay are fed into a twin screw extruder at a ratio of 18:1:1. The extruder is heated to 200° C. As the material is compounded, the melt contacts an ultrasonic horn vibrating at 20 kHz. The material acquires sonic energy during the melt residence time in the extruder barrel. The compounded strand is cooled in a water bath and pelletized.

EXAMPLE 14

Polypropylene, maleic anhydride grafted polypropylene, and nanoclay are fed into a twin screw extruder at a ratio of 3:3:4 to produce a polymer nanocomposite masterbatch. The extruder is heated to 190° C. As the material is compounded, the melt contacts several ultrasonic horns in series along the barrel of the extruder, each vibrating at 20 kHz. The material strand is cooled in a water bath and pelletized. The masterbatch is let down with polypropylene at a ratio of 1:7 (MB:PP) in an extruder or injection molding process.

EXAMPLE 15

Polymer nanocomposite pellets are fed into an injection molding machine (Boy Machines Model 80M). The barrel of the injection molding machine is equipped with an ultrasonic horn such that the horn contacts the plasticized material. As the material is plasticized and injected into the mold, sonic energy is imparted into the material from the horn during the injection molding cycle time. The barrel zones are heated between 175° C. and 200° C. The mold temperature is maintained at 25° C.

Determination of Filler Dispersion and Exfoliation

The effectiveness of the methods of the present invention is quantified by a combination of wide angle X-ray diffraction ("WAXS") and transmission electron microscopy ("TEM"). WAXS allows the determination of the interlayer spacing of the platelets in a layered silicate clay dispersed in a polymer matrix. Typically the peak(s) corresponding to $2\theta$ for the silicate clay will be less than 5°. Application of the Bragg equation allows the $2\theta$ value to be converted to an interlayer spacing. WAXS was performed on a conventionally processed nanoclay/polypropylene mixture and a mixture processed by the method of the present invention. The conventionally processed silicate clay (I.30E) polypropylene mixture has an interlayer spacing of about 25.6 Å while the sonically processed clay/polypropylene mixture has an interlayer spacing of about 31.7 Å. Table I provides the interlayer spacing determined by WAXS for several polypropylene clay mixture before and after sonication.

TABLE I

| Mixture number | Polypropylene matrix | nano-clay | interlayer spacing before sonication (Å) | interlayer spacing after sonication (Å) | % change in interlayer spacing |
|---|---|---|---|---|---|
| 1 | Ph020 (low mol. wt.) | I.30E | 23.6 | 36 | 53% |
| 2 | PP6523 (medium mol. wt.) | I.30E | 25.6 | 31.7 | 24% |
| 3 | PP6823 (high mol. wt.) | I.30E | 35 | 37 | 6% |
| 4 | PP6523/PP-MA | I.30E | 27.5 | 35.5 | 29% |
| 5 | PP6523/PP-MA | SCF I.30E | 29 | 36.5 | 26% |

Examples 1 through 3 show an increase in interlayer spacing after sonication for combinations of a nonoclay with low, medium, and high molecular weight polypropylene polymers. The effect is most significant for the low molecular weight polypropylene. In Example 4, a medium molecular weight polypropylene is processed with the maleic anhydride grafted polypropylene oligomer. This compatibilizer is known to assist in the dispersion of nanoclay. As demonstrated in Example 4, the method of the present invention enhances the clay dispersion in this combination. Finally, Example 5 provides the dispersion of a nanoclay that has been processed with a supercritical fluid. Again the method of the present invention shows an enhancement in clay dispersion and exfoliation for this pre-dispersed combination. Preferably, the method of the present invention disperses the nanoclay such that the layer distances are increased by at least 5%. More preferably, the layer distances are increased by at least 15%, and most preferably the layer distances are increased by at least 25%.

Although the WAXS analysis indicates significant dispersion by the method of the present invention, it is must be understood that WAXS cannot provide a complete picture of filler exfoliation and dispersion in the polymer matrix. For layered silicates in which the platelets have completely exfoliated and dispersed, there will be no corresponding signal in the WAXS because the order has been destroyed. Accordingly, TEM analysis is an important supplement to understand the nature and degree of filler dispersion. TEM micrographs of Examples 1–3 in Table 1 revealed separation of the platelets forming the nanoclays.

While the best mode for carrying out the invention has been described in detail, those familiar with the art to which this invention relates will recognize various alternative designs and embodiments for practicing the invention as defined by the following claims.

What is claimed:

1. A method of forming a polymer-filler composite, the method comprising:
   a) sonicating a polymer mixture comprising a thermoplast polymer and a filler at a sonic energy level sufficient to disperse the filler within the thermoplastic polymer;
   wherein the thermoplastic polymer is in a melted state and mechanically stirred during sonicating and wherein the step of sonicating the polymer mixture is performed at a frequency from 5 kHz to $10^{10}$ kHz with an energy density from about 5 kJ/g to about 100 kJ/g.

2. The method of claim 1 wherein the polymer mixture is formed by a process comprising:
   a) combining a thermoplastic polymer and a filler together to form a polymer premix; and b) heating the polymer premix at a sufficient temperature to melt the thermoplastic polymer.

3. The method of claim 1 wherein the polymer mixture is formed by a process comprising:
   a) combining a thermoplastic polymer, a compatibilizer, and a filler together to form a polymer premix; and
   b) heating the polymer premix at a sufficient temperature to melt the thermoplastic polymer.

4. The method of claim 3 wherein the polymer mixture is mechanically stirred.

5. The method of claim 1 where the step of sonicating the mixture is accomplished with at least one sonicator.

6. The method of claim 5 wherein the method comprise sonicating the mixture for a time period of about 10 seconds to 10 minutes.

7. The method of claim 1 wherein:
   the step of sonicating the polymer mixture is performed at a frequency from 15 kHz to 200 MHZ
   with an energy density from about 10 kJ/g to bout 40 kJ/g.

8. The method of claim 1 wherein:
   the step of sonicating the polymer mixture is performed at a frequency from 15 kHz to 40 kHz
   with an energy density from about 10 kJ/g to bout 40 kJ/g.

9. The method of claim 1 wherein the filler is from about 0.1% to 50% of the polymer mixture.

10. The method of claim 1 wherein the filler is montmorillonite clay, kaolin clay, calcium carbonate, titanium dioxide, talc, zirconium dioxide zinc oxide, calcium silicate, aluminum silicate, calcium sulfate, alumina trihydrate, glass fibers, carbon fibers, or mixtures thereof.

11. The method of claim 10 where the spacing between layers in the layered silicate are increased by at least 5%.

12. The method of claim 1 wherein the filler is a layered silicate clay.

13. The method of claim 1 wherein the filler comprises:
   a first filler material comprising a silicate clay; and
   a second filler material selected from the group consisting of calcium carbonate, titanium dioxide, talc, zirconium dioxide, zinc oxide, calcium silicate, aluminum silicate, calcium sulfate, alumina trihydrate, glass fibers, carbon fibers, and mixtures thereof.

14. The method of claim 1 wherein the thermoplastic polymer is a polyolefin-based polymer, a polystyrene-based polymer, a polycabonate polymer, or mixtures thereof.

15. The method of claim 1 wherein the thermoplastic polymer is a polyethylene homopolymer, a polyethylene copolymer, a polypropylene homopolymer, or a polypropylene copolymer.

16. The method of claim 1 wherein a thermoplastic polymer is a polypropylene homopolymer.

17. The method of claim 1 wherein the polymer mixture is introduced into a plastics extruder and the step of sonicating the mixture is performed while the mixture is within the extruder.

18. The method of claim 1 wherein the polymer mixture is introduced into an injection molding apparatus and the step of sonicating the mixture is performed while the mixture is within the injection molding apparatus.

19. The method of claim 1 wherein the polymer mixture is introduced into a plastics extruder and the step of sonicating the mixture is performed while the mixture is within the extruder.

20. A molded article made in accordance with the method of claim 1.

21. A molded article made in accordance with the method of claim 1.

22. A polymer-filler composite made by the process comprising:
   a) sonicating a polymer mixture comprising a thermoplastic polymer and a filler at a sonic energy level sufficient to disperse the filler within the thermoplastic polymer;
   wherein the thermoplastic polymer is in a melted state and mechanically stirred and the filler is dispersed during the sonicating and wherein the step of sonicating is at a frequency from 15 kHz to 40 kHz with an energy density from about 10 kJ/g to about 40 kJ/g.

23. The polymer-filler composite claim 22 wherein the polymer mixture is formed by a process comprising:
   a) combining a thermoplastic polymer and a filler together to form a polymer premix; and
   b) heating the polymer premix at a sufficient temperature to melt the thermoplastic polymer.

24. The polymer-filler composite of claim 22 wherein:
   the step of sonicating the polymer mixture is performed at a frequency from 15 kHz to 200 MHZ
   with an energy density from about 10 kJ/g to a out 40 kJ/g.

25. The polymer-filler composite of claim 22 wherein:
   the step of sonicating the polymer mixture is performed at a frequency from 15 kHz to 50 kHz
   with an energy density about 10 kJ/g to about 40 kJ/g.

26. The polymer-filler composite of claim 22 wherein the filler is from about 0.1% to 30% of the polymer mixture.

27. The polymer-filler composite of claim 22 wherein the filler is montmorillonite clay, kaolin clay, calcium carbonate, titanium dioxide, talc, zirconium dioxide, zinc oxide, calcium silicate, aluminum silicate, calcium sulfate, alumina trihydrate, glass fibers, carbon fibers, or mixtures thereof.

28. The polymer-filler composite of claim 22 wherein the filler is a layered silicate clay.

29. The polymer-filler composite of claim 22 wherein the filler is an aluminum silicate clay.

30. The polymer-filler of claim 22 wherein the filler comprises:
   a first filler material comprising a silicate clay; and
   a second filler material selected from the group consisting of calcium carbonate, titanium dioxide, talc, zirconium dioxide, zinc oxide, calcium silicate, aluminum silicate, calcium sulfate, alumina trihydrate, glass fibers, carbon fibers, and mixtures thereof.

31. The polymer-filler composite of claim 22 wherein the thermoplastic polymer is a polyolefin-based polymer, a polystyrene-based polymer, a polycabonate polymer, or mixtures thereof.

32. The polymer-filler composite of claim 21 wherein a thermoplastic polymer is a polyethylene homopolymer, a polyethylene copolymer, a polypropylene homopolymer, or a polypropylene copolymer.

33. The polymer-filler composite of claim 22 wherein a thermoplastic polymer is a polypropylene homopolymer.

34. A molded article made from the polymer-filler composite of claim 22.

35. The polymer-filler composite of claim 22 wherein the thermoplastic polymer is a polyolefin-based polymer, a polystyrene-based polymer, a polycabonate polymer, or mixtures thereof.

36. The polymer-filler composite of claim 22 wherein a thermoplastic polymer is a polyethylene homopolymer, a polyethylene copolymer, a polypropylene homopolymer, or a polypropylene copolymer.

37. A method of forming a polymer-filler composite, the method comprising:

a) sonicating a polymer mixture comprising a thermoplastic polymer and a layered silicate at a sonic energy level sufficient to disperse the layered silicate within the thermoplastic polymer;

wherein the thermoplastic polymer is in a melted state during sonicating and the polymer mixture is formed by a process comprising:

mixing the layered silicate with the thermoplastic polymer to form a treatable silicate-polymer mixture; and contacting the silicate-polymer treatable mixture with a supercritical fluid to form a contacted mixture; and depressurizing the contacted mixture to form the polymer mixture.

38. The method of claim 37 where the step of sonicating the mixture is accomplished with at least one sonicator.

39. The method of claim 37 wherein:

the step of sonicating the polymer mixture is performed at a frequency from 5 kHz to $10^{10}$ kHz; and the sonic energy level is from about 5 kJ/g to about 100 kJ/g.

40. The method of claim 37 wherein:

the step of sonicating the polymer mixture is performed at a frequency from 15 kHz to 200 MHZ; and the sonic energy is from about 10 kJ/g to about 40 kJ/g.

41. The method of claim 37 wherein the filler is from about 0.1% to 50% of the polymer mixture.

* * * * *

UNITED STATES PATENT AND TRADEMARK OFFICE
Certificate

Patent No. 6,828,371 B2

Patented: December 7, 2004

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Ellen Cheng-chi Lee, Ann Arbor, MI (US); Deborah Frances Mielewski, Ann Arbor, MI (US); and Ronald J. Baird, Grosse Ile, MI (US).

Signed and Sealed this Nineteenth Day of July 2011.

KAT WYROZEBSKI
*Supervisory Patent Examiner*
Art Unit 1746
Tecnology Center 1700